United States Patent [19]

Honda

[11] Patent Number: 4,879,599
[45] Date of Patent: Nov. 7, 1989

[54] METHOD OF SUB-SAMPLING INTERPOLATION

[75] Inventor: Tsutomu Honda, Saitama, Japan

[73] Assignee: Pioneer Electronic Corporation, Tokyo, Japan

[21] Appl. No.: 176,002

[22] Filed: Mar. 31, 1988

[30] Foreign Application Priority Data

Mar. 31, 1987 [JP] Japan ................................ 62-77994

[51] Int. Cl.$^4$ .............................................. H04N 7/13
[52] U.S. Cl. ..................................... 358/138; 358/133
[58] Field of Search ................................. 358/133, 138

[56] References Cited

U.S. PATENT DOCUMENTS

| | | | |
|---|---|---|---|
| 4,700,345 | 10/1987 | Morcom | 358/138 |
| 4,783,698 | 11/1988 | Harney | 358/133 |
| 4,797,741 | 1/1989 | Sato | 358/138 |
| 4,816,913 | 3/1989 | Harney | 358/133 |

Primary Examiner—Howard W. Britton
Attorney, Agent, or Firm—Sughrue, Mion, Zinn, Macpeak & Seas

[57] ABSTRACT

For sub-sampling interpolation, two interpolation sampled values are calculated from two groups of sampling points arranged in the horizontal and vertical scanning directions, respectively, or in the horizontal scanning and temporal directions, respectively. The one of the two interpolation sampled values which is closest to its immediately preceding sampled value is selected.

7 Claims, 8 Drawing Sheets

(A)  20 MHz (B)  16 MHz

(C)  12 MHz

(D)  8 MHz

(E)  4 MHz

FIG. 5

(A)  20 MHz (B)  16 MHz

(C)  12 MHz

(D)  8 MHz (E)  4 MHz

```
         CENTER
         ⓘⓞⓞ   39    0    4    0    1    0    0
          39   ⊖1⊖  -12    0   -2    0   -1    0
  3×3
           0   -12   ⊖1⊖   7    0    1    0    0
  5×5
           4    0    7   ⊖-1⊖ -5    0   -1    0
  7×7
           0   -2    0   -5   ⊖1⊖   3    0    0
  9×9
           1    0    1    0    3   ⊖-1⊖ -2    0
 11×11
           0   -1    0   -1    0   -2   ⊖1⊖   2
 13×13
           0    0    0    0    0    0    2   ⊖-1⊖
```

(A)  20 MHz

(B)  16 MHz (C)  12 MHz (D)  8 MHz

(E)  4 MHz

FIG. 19

(A)  20 MHz (B)  16 MHz (C)  12 MHz

(D)  8 MHz

(E)  4 MHz

FIG. 20

(A)  20 MHz

(B)  16 MHz (C)  12 MHz (D)  8 MHz (E)  4 MHz

- ○ 4n-th FIELD
- □ (4n+1)-th FIELD
- • (4n+2)-th FIELD
- ■ (4n+3)-th FIELD
- x SAMPLING POINT WHICH IS NOT TRANSMITTED
- n: INTEGER
- h: SCANNING LINE INTERVAL
- d: SAMPLING INTERVAL

METHOD OF SUB-SAMPLING INTERPOLATION

BACKGROUND OF THE INVENTION

1. Field of Invention

The present invention relates to a method of sub-sampling interpolation, and particularly relates to a method of sub-sampling interpolation for performing sub-sampling transmission of a picture signal.

2. Background Art

Figure 8:
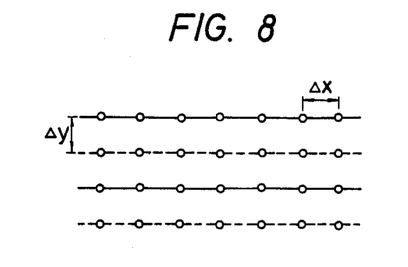
FIG. 8 is a diagram illustrating a sampling pattern of the original signal.
Figure 9:
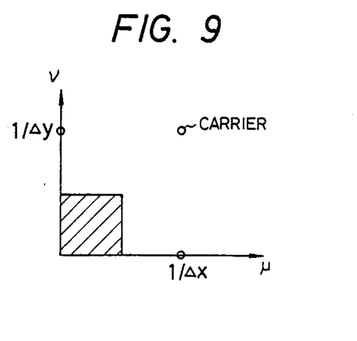
FIG. 9 is a diagram illustrating a frequency range which can be transferred by the sub-sampling according to the sampling pattern in FIG. 8.
Figure 10:
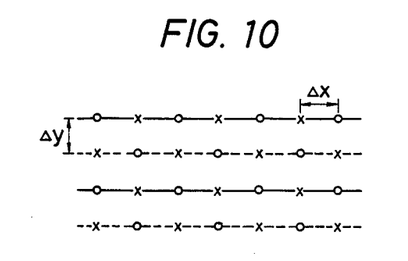
FIG. 10 is a diagram illustrating a sampling pattern for field offset sub-sampling.

In a known system for compressing the band width required to transmit a picture signal, a sub-sampling transmission system produces sampled values obtained through sub-sampling effected in each of a plurality of successive periods, each having a predetermined length which is N times as long as a period of one picture signal field (N being a natural number). These sampled values are successively transmitted. The transmitted sampled values in each of the periods of predetermined length are used to interpolate non-transmitted sample values in the period of predetermined length to thereby reproduce an original picture signal. There are various forms of sampling transmission systems. Two well known forms are the field offset sub-sampling technique and the line offset sub-sampling technique.

Where sampling points are arranged in a square lattice, as shown in FIG. 8, when a picture signal is sampled, the spatial freqency range which can be transmitted being as shown in FIG. 9, a sampling interval is represented by $\Delta x$ and a scanning line interval is represented by $\Delta y$. FIGS. 10 and 12 show sampling patterns, respectively, for performing the field offset sub-sampling and the line offset sub-sampling on a picture signal which has been subjected to sampling on the basis of the sampling pattern of FIG. 8. In each of FIGS. 10 and 12, the positional relationship of sampling points in two successive fields is shown. In the positional relationship of sampling positions illustrated in the drawings, sampled values at sampled points represented by the mark of O and aligned on solid lines are transmitted in the n-th field (n being a natural number), and sampled values at sampling points represented by the mark of O and aligned on broken lines are transmitted in the (n+1)-th field. The mark x designates sampling points which are not transmitted.

Figure 11:
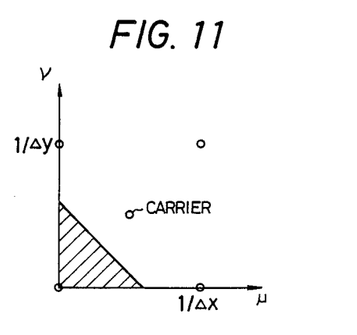
FIG. 11 is a diagram illustrating a range which can be transmitted by the field offset sub-sampling.
Figure 12:
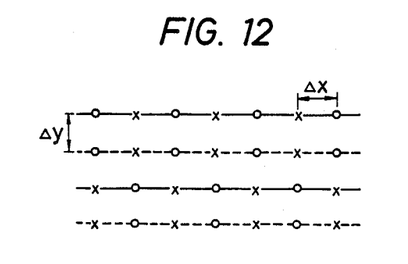
FIG. 12 is a diagram illustrating a sampling pattern for the line offset sub-sampling.
Figure 13:
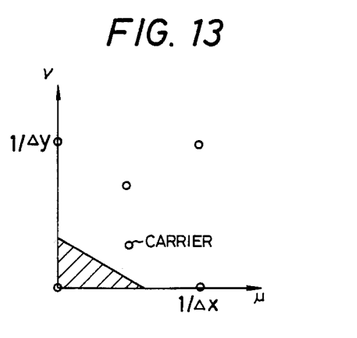
FIG. 13 is a diagram illustrating the range which can be transmitted by line offset sub-sampling.

The ranges which can be transmitted for the field offset sampling technique and for the line offset sampling technique are as shown in FIGS. 11 and 13, respectively.

Figure 14:
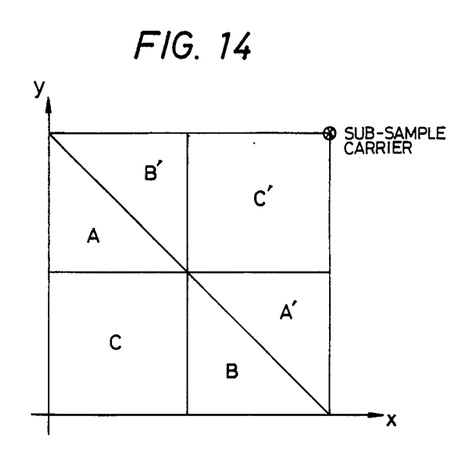
FIG. 14 is a diagram illustrating a range which can be transmitted using sub-sampling.

If it is assumed that the range to be transmitted by the offset sub-sampling technique is composed of zones A, B and C, illustrated in FIG. 14, the respective components of zones A, B and C are reflected so as to generate zones A', B' and C' by the sub-sampling carrier when the offset sub-sampling is made with respect to a signal band-limited to the zones A, B and C. Consequently, an actually transmitted signal has a spectrum extending over a range consisting of the zones A, B, C, A', B', and C'. Therefore, in order to eliminate unnecessary components caused by reflection of the sub-sampling carrier, it is necessary to provide a pre-filter for limiting the band into a transmissible range at the transmitter sides. At the same time, it is necessary to provide a post-filter having LPF (low pass filter) arrangement at the receiver side so as to pass the signal through the LPF arrangement to thereby eliminate the components of the zones A', B' and C' before interpolation of the non-transmitted points is carried out.

In such a conventional method of sub-sampling interpolation, in which the interpolation of non-transmitted points is performed at the receiver side, a two-dimensional digital filter has been used as a post-filter.

Figure 15:
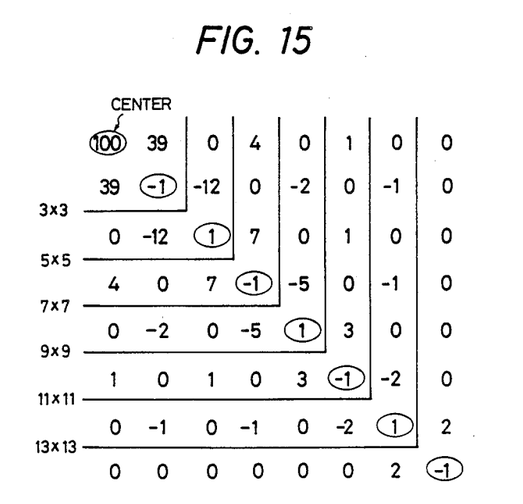
FIG. 15 is a diagram illustrating tap coefficients of two-dimensional filters.

If the two-dimensional digital filter acting as a post-filter is a FIR (finite impulse response) filter, tap coefficients of the two-dimensional digital filter can be obtained as shown in FIG. 15 on the basis of inverse-DFT (discrete Fourier transformation). In FIG. 15, numerals at the left side represent the number of the taps constituting the filter.

Figure 16:
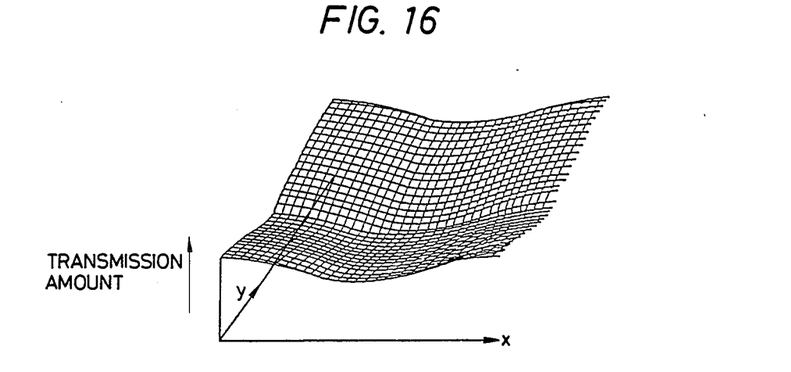
FIG. 16 is a diagram illustrating the frequency characteristic of a two-dimensional filter having 3×3 taps.
Figure 17:
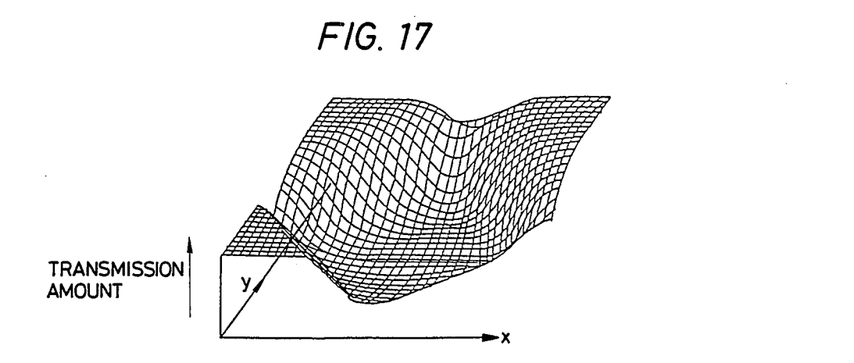
FIG. 17 is a diagram illustrating the frequency characteristic of a two-dimensional filter having 11×11 taps, FIGS. 18 (A)–(E) are diagrams illustrating sampled values obtained by sampling an original signal, FIGS. 19 (A)–(E) are diagrams illustrating sampled values obtained by performing interpolation using a two-dimensional filter having 3×3 taps, FIGS. 20 (A)–(E) are diagrams illustrating sampled values obtained by interpolation using a two-dimensional filter having 11×11 taps.

If each of the tap coefficients is multiplied by a Hamming window so as to make the tap length finite, the characteristics of a $3 \times 3$ tap filter and a $11 \times 11$ tap filter can be obtained on the basis of a DFT, as shown in FIGS. 16 and 17, respectively. As shown in FIGS. 16 and 17, a triangular passing range can be satisfied when the number of taps in a filter is $11 \times 11$ or more.

Figure 18:
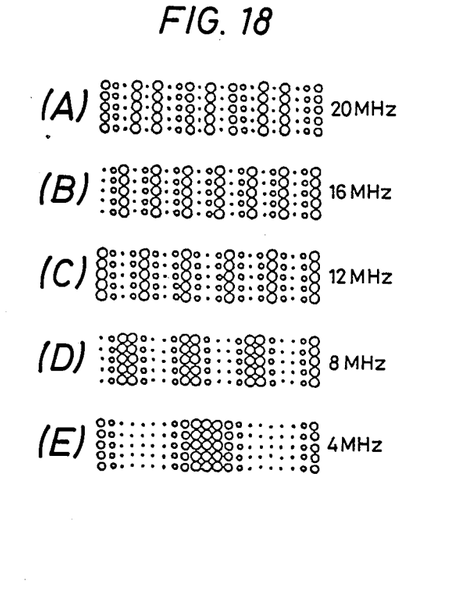
Figure 19:
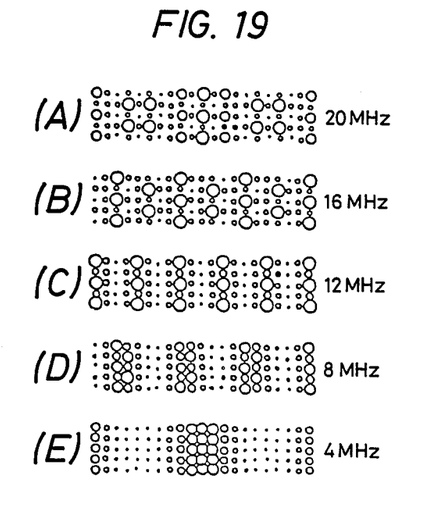
Figure 20:
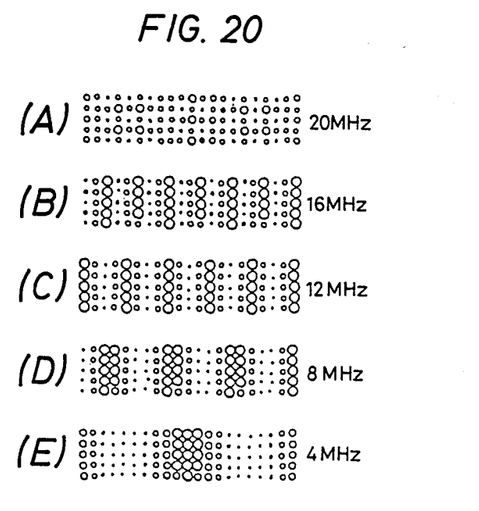
Figure 21:
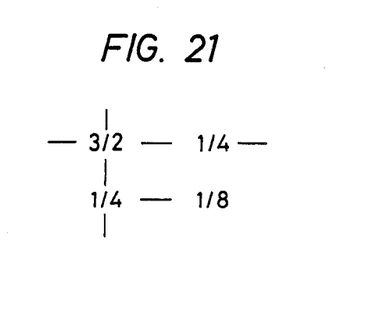
FIG. 21 is a diagram illustrating the tap coefficients of a 3×3 tap filter.
Figure 22:
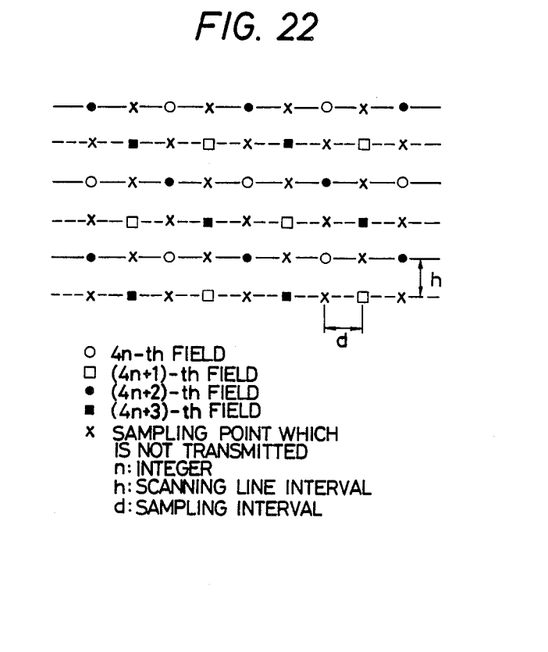
FIG. 22 is a diagram illustrating a sub-sampling pattern of a MUSE signal.

The actual sub-sampling transmission of a picture signal was simulated on a computer, the result of simulation being shown in FIGS. 18 to 20. The FIG. 18 diagrams each shows sampled values obtained at respective sampling points by sampling an original picture signal having components arranged only in the horizontal scanning direction, where the sampling frequency is selected to 48 MHz and the sampling points are arranged in a square lattice. In diagrams (A) to (E) of FIG. 18, the sampled values at the respective sampling points are shown for picture signal frequencies set to 20 MHz, 16 MHz, 12 MHz, 8 MHz and 4 MHz, respectively, under the conditions that, in each case, the picture signal consists only of components in the horizontal scanning direction and the magnitude of the sampled value at each sampling point is represented by the magnitude of the diameter of the mark O. The signal obtained by such sampling is passed through a pre-filter, which may be a two-dimensional filter having taps the number of which is $11 \times 11$, and then subjected to sampling so as to obtain sampled values. The thus obtained sampled values are transmitted, and the transmitted sampled values are received and then subjected to interpolation through a two-dimensional filter having taps the number of which is $3 \times 3$ to thereby obtain such sampled values as shown in the respective diagrams (A) to (E) of FIG. 19. Alternatively, if the transmitted and received sampled values are subjected to interpolation through a two-dimensional filter having taps the number of which is 11x11, sampled values as shown in the respective diagrams (A) to (E) of FIG. 20 are obtained. However, the $3 \times 3$ tap filter used to obtain the results illustrated in FIG. 19 is not the same as that of FIG. 16, but has coefficients arranged to make the band extend horizontally as well as vertically. The coefficients of this $3 \times 3$ tap filter are shown in FIG. 21.

From this simulation, it is found that components not lower than 16 MHz can not be reproduced when a $3 \times 3$ tap filter is used as a post-filter, and components of 20 MHz can not be effectively reproduced even when a $11 \times 11$ tap filter is used.

Accordingly, in the conventional method of sub-sampling interpolation, wherein the interpolation is performed by using a two-dimensional filter, there exists the problem that the transmission band is reduced which thereby lowers the resolution of a reproduced picture, unless a larger two-dimensional filter having taps the number of which is not smaller than $11 \times 11$ is used. Therefore, it is necessary to provide such a larger two-dimensional filter and the circuit arrangement at the receiver is necessarily of large size.

SUMMARY OF THE INVENTION

It is therefore an object of the present invention to provide a method of sub-sampling interpolation in which the interpolation can be achieved without deteriorating the resolution of a reproduced picture.

According to the sub-sampling interpolation method of the invention, two interpolation sampled values are calculated on the basis of sampled values at two groups of sampling points arranged, respectively, in the horizontal scanning direction and in the vertical scanning direction or in the horizontal scanning direction and in the time-base direction. The interpolation is achieved on the basis of the one of those two interpolation sampled values which has a difference between the one interpolation sampled value and a preceding sampled value immediately before the one interpolation sampled value which is smaller than the difference between the other interpolation sampled value and a preceding sampled value immediately before the other interpolation sampled value.

Therefore, according to the present invention, a method of subsampling interpolation in a sub-sampling transmission system comprises the steps of:

successively transmitting sampled values obtained by oub sampling a picture signal in each of a plurality of successive periods, each having a predetermined length, said plurality of successive periods being N times the period of one picture field (N being a natural number);

receiving said transmitted sampled values; and interpolating non-transmitted sampled values in each of said periods of predetermined length from said sampled values transmitted within at least two periods of predetermined length, said two periods including the period of said non-transmitted sampled values, so as to reproduce said picture signal; wherein said interpolation step comprises the steps of:

calculating two one-directional interpolation sampled values for interpolating said non-transmitted sampled values with sampled values which are part of said sampled values transmitted in said two periods of predetermined length and are obtained at two groups of sampling points arranged respectively in the horizontal scanning direction and in the vertical scanning direction with respect to sampling points of said non-transmitted sampled values;

detecting two one-directional high frequency components at said sampling points of said non-transmitted sampled values using said sampled velues at said two groups of sampling points, respectively, arranged in the horizontal scanning direction and in the vertical scanning direction;

comparing respective absolute values of said two one-directional high frequency components with each other;

mixing said two interpolation sampled values with each other, with the ratio of the one of said two interpolation sampled values in the direction along which said absolute value is smaller than the other absolute value along the other direction to the other one of said two interpolation sampled values being larger than 1; and interpolating said non-transmitted sampled values from the two mixed interpolation sampled values.

DESCRIPTION OF THE PREFERRED EMBODIMENT

An embodiment according to the present invention will be described in detail with refernece to FIGS. 1 to 7.

Figure 1:
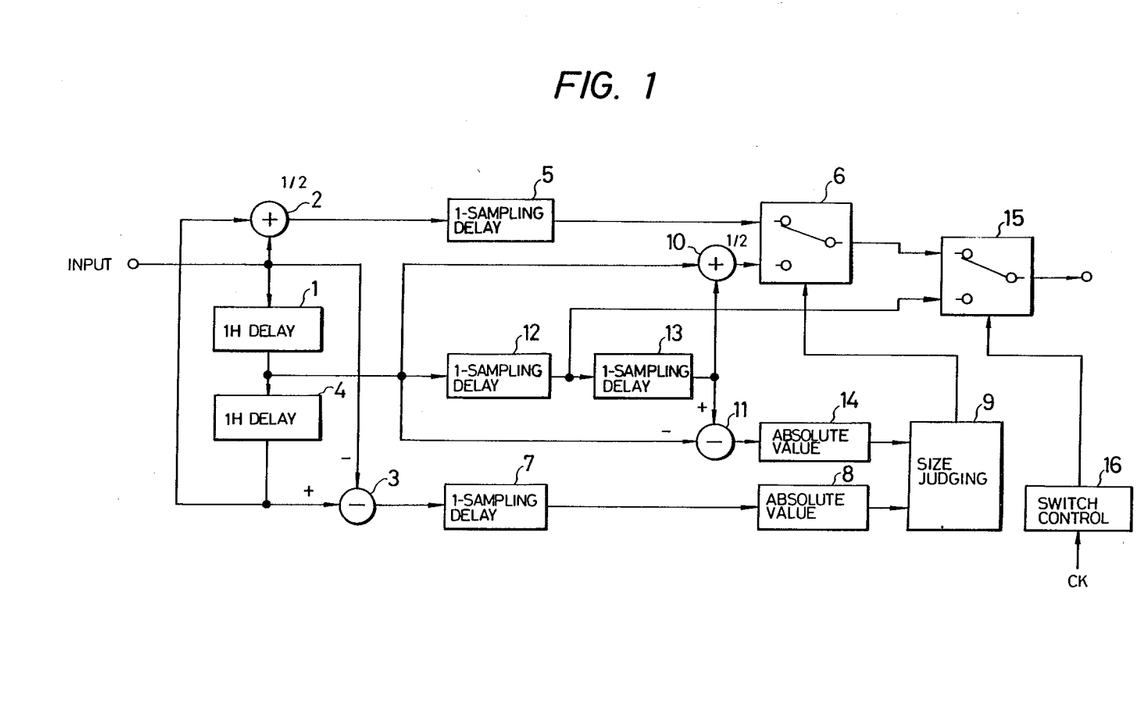
FIG. 1 is a block diagram illustrating an embodiment according to the present invention.

In FIG. 1, an input signal, that is, a picture signal which has been subjected to sampling and transmitted through sub-sampling transmission, is supplied to a 1H-delay circuit 1, an adder 2 and a subtracter 3. The adder 2 is arranged to include a coefficient device which multiplies the result of the addition by a coefficient of ½. The input signal which has been delayed by the 1H-delay circuit 1 by 1H (1 field period in the case of the field offset sub-sampling, or 2 horizontal scanning periods in the case of the line offset sub-sampling) is further delayed by a 1H-delay circuit 4 by 1H (2 horizontal scanning periods in both the field offset sub-sampling and the line offset sub-sampling). The output of the 1H-delay circuit 4 is supplied to the adder 2 so as to be added to the input signal. At the same time, the output of the delay circuit 4 is supplied to subtracter 3 so as to be subtracted from the input signal.

The output of the adder 2 is delayed by a 1-sampling delay circuit 5 by the time corresponding to one sampling interval, that is, by the time corresponding to, for example, 1/48 MHz. The output of the delay circuit 5 is supplied to one of the inputs of a changeover switch 6. The output of the subtracter 3 is delayed by the time corresponding to one sampling interval by a 1-sampling delay circuit 7. The output of the delay circuit 7 is supplied to an absolute value circuit 8 so that the absolute value of the output of the delay circuit 7 is calculated. The output of the absolute value circuit 8 is supplied to a size judging circuit 9.

Additionally, the output of the 1H-delay circuit 1 is supplied to an adder 10 and a subtracter 11, and at the same time supplied to a 1-sampling delay circuit 12 so as to be delayed by the time corresponding to one sampling interval. Similar to the adder 2, the adder 10 is arranged to include coefficient device which multiplies the result of addition by a coefficient of ½. The output of the delay circuit 12 is supplied to a 1-sampling delay circuit 13 so as to be further delayed by the time corresponding to one sampling interval. The output of the delay circuit 13 is supplied to the adder 10 so as to be added to the output of the 1H-delay circuit 1. The output of the delay circuit 13 is supplied also to the subtracter 11 so that the output of the 1H-delay circuit 1 is subtracted from the output of the delay circuit 13. The output of the adder 10 is supplied to the other input of the changeover switch 6. The output of the subtracter 11 is supplied to an absolute value circuit 14 so that the absolute value of the output of the subtracter 11 calculated. The output of the absolute value circuit 14 is supplied to the size judging circuit 9.

The size judging circuit 9 may be, for example, a comparator arranged to output a signal corresponding to the relationship between the sizes of the outputs of the respective absolute value circuits 8 and 14. The output of the size judging circuit 9 is supplied to a control input of the changeover switch 6. The changeover switch 6 is arranged to select its output on the basis of the output of the size judging circuit 9, so as to selectively pass the output of the adder 10 when the output of the absolute value circuit 8 is larger than that of the absolute value circuit 14 and to selectively pass the output of the delay circuit 5 when the output of the absolute value circuit 8 is not larger than that of the absolute value circuit 14.

An interpolation sampled value output of the changeover switch 6 is supplied to one of the inputs of a changeover switch 15. The output of the delay circuit 12 is supplied to the other input of the changeover switch 15. The output of a switch control circuit 16 is supplied to the changeover switch 15 as a switch control signal. The switch control circuit 16 may be, for example, a T-type flip-flop arranged so as to be inverted by a clock pulse, ck, of a frequency corresponding to one sampling interval, the clock pulse, being produced from a clock generator circuit or the like (not-shown). The interpolation sampled value which is passed through the changeover switch 6 and the transmission sampled value output from the delay circuit 12 are alternately passed through the changeover switch 15.

Figure 2:
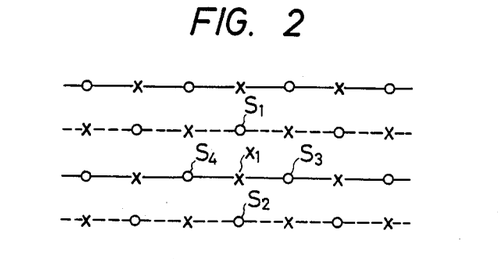
FIG. 2 is a diagram illustrating a sampling pattern.

In the above-mentioned arrangement, the 1H-delay circuits 1 and 4, and the adder 2 constitute a one-dimensional LPF aligned in the vertical scanning direction, so that the adder 2 outputs an interpolation sampled value which is calculated on the basis of sampled values at two sampling points $s_1$ and $s_2$ aligned in the vertical scanning direction and positioned on both sides of a sampling point $x_1$ at which interpolation is performed according to a sampling pattern as shown in FIG. 2. On the other hand, the 1-sampling delay circuits 12 and 13, and the adder 10 constitute another one-dimensional LPF aligned in the horizontal scanning direction, so that the adder 10 outputs an interpolation sampled value which is calculated on the basis of sampled values at two sampling points $s_3$ and $s_4$ aligned in the horizontal scanning direction and positioned on both sides of the sampling point $x_1$ at which the interpolation is performed.

Assume now that the range to be transmitted by the foregoing offset sub-sampling is composed of the zones A, B and C in FIG. 14. If the offset sub-sampling is performed on a signal restricted to the range, the respective components of the zones A, B and C are reflected so as to generate zones A', B' and C' by the sub-sampling carrier when the offset sub-sampling is made with respect to a signal band-limited into those zones A, B and C. Consequently, an actually transmitted signal has a spectrum extending over a range consisting of the zones A, B, C, A', B' and C'. Of those zones A, B, C, A', B' and C', the zone C may be separated from the zone C' by using a one-dimensional LPF arranged either in the x-direction or in the y-direction. However, if interpolation is performed by using a one-dimensional LPF, for example, arranged in the x-direction in the other zones, zones A', B and C' are blocked and zones A, B' and C are passed, so that zones B is not transmitted while the components in the zone B' are, to thereby result in the reflection distortion.

Since the components of the zone B' do not exist at the instant when the components of the zone A are transmitted, the unnecessary components generated in the range A' due to reflection are eliminated by the use of the one-dimensional LPF in the x-direction to thereby perform desirable interpolation. In the same manner, since the components of the zone A' do not exist at the instant when the components of zone B are transmitted, the unnecessary components generated in the zone B' due to reflection are eliminated by the use of one-dimensional LPF in the y-direction to thereby perform desirable interpolation.

Then, since a non-transmitted sampled value isimensional LPF in the y-direction to thereby perform desirable interpolation.

Figure 3:
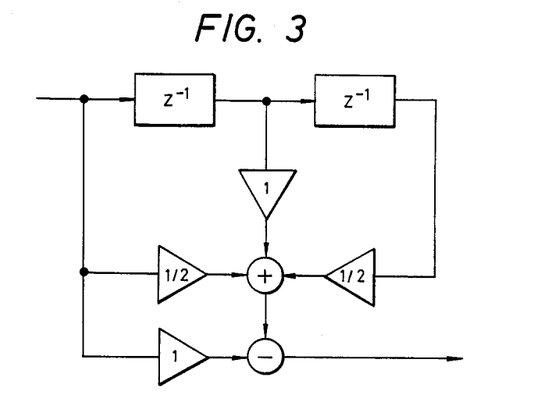
FIG. 3 is a diagram illustrating a HPF arrangement which may be used in the apparatus of FIG. 1, FIGS. 4 (A)–(E) to 6 (A)–(J) are diagrams illustrating sampled values obtained by the apparatus of FIG. 1.

Then, since a non-transmitted sampled value is "O" when a signal corresponding to a non-transmitted sampling point is output from the delay circuit 12, each of the circuits constituted by the 1H-delay circuits 1 and 4 and the subtracter 3, and the circuit constituted by the delay circuits 12 and 13 and the subtracter 11 may be regarded as a circuit which is equivalent to a one-dimensional HPF as shown in FIG. 3 and which has a transfer function H(z) expressed as follows, $$H(z) = O(\tfrac{1}{2})(z^{-2} + 2z^{-1} - 1) \tag{1}$$

From the equation (1), the frequency characteristic $H(e^{jWT})$ is expressed as follows.

$$\begin{aligned} H(e^{j\omega T}) &= -1/2\, e^{-j\omega T}(e^{-j\omega T} - e^{j\omega T} + 2) \\ &= -e^{-j\omega T}(1 - j\sin \omega T) \end{aligned} \tag{2}$$

Therefore, the absolute value of $H(e^{jWT})$ is expressed as follows.

$$|H(e^{j\omega T})| = \sqrt{1 + \sin^2 \omega T} \quad (3)$$

In the x-y plane in which the horizontal scanning direction is made to correspond to the x-axis, and the vertical scanning direction is made to correspond to the y-axis, the condition in which the respective absolute values of the outputs of the subtracters 14 and 8 become equal is expressed as follows.

$$1 + \sin^2 x = 1 + \sin^2 y$$

$$\sin x = \pm \sin y$$

$$\therefore y = \pm x + n\pi$$

Since the line expressed by $y = \pi - x$ corresponds to the boundary between the zones A and B' and between the zones A' and B, a judgement is made as to whether the point to be interpolated belongs to the zone B or B' or to the zone A or A'. This judgement is made on the basis of the output of the size judging circuit 9. Since switching of changeover switch 6 is controlled by the output of the size judging circuit 9, the components of zone A which are extracted by the LPF in the x-direction, that is, the interpolation sampled value produced from the adder 10, is selectively output so that the interpolation is performed properly when the point to be interpolated belongs to the zone A or A'. On the other hand, when the point to be interpolated belongs to the zone B or B', the components of the zone B which are extracted by the LPF in the y-direction, that is, the interpolation sampled value produced from the adder 2 and delayed by the time corresponding to one sampling interval, is selectively output so that the interpolation is properly performed.

Figure 4:
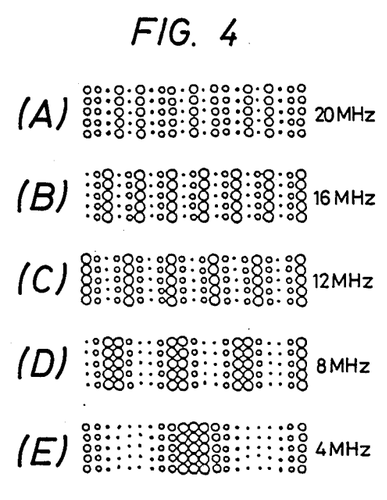
Figure 5:
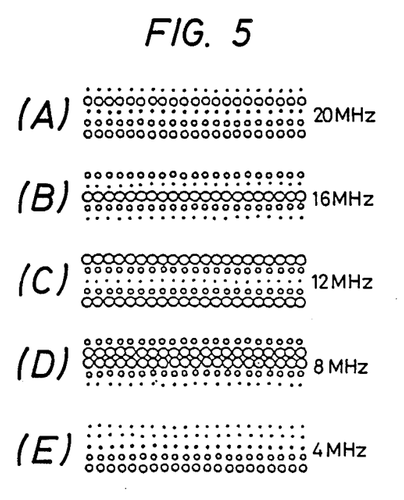
Figure 6:
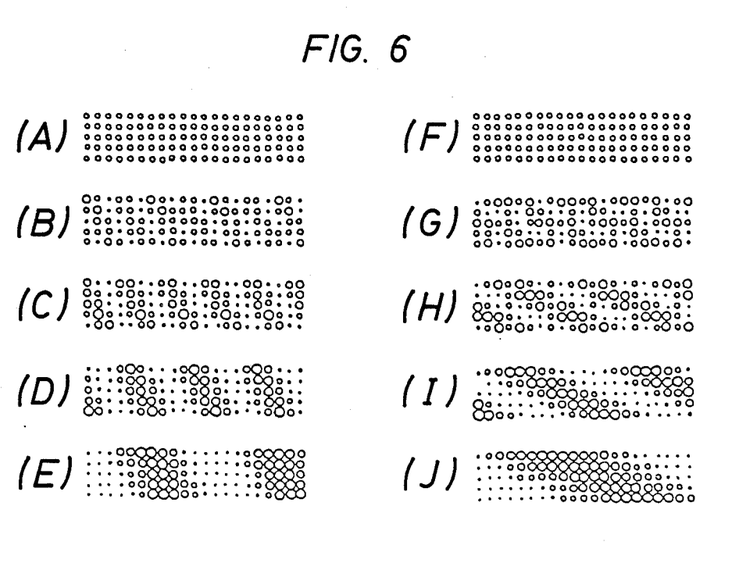
Figure 7:
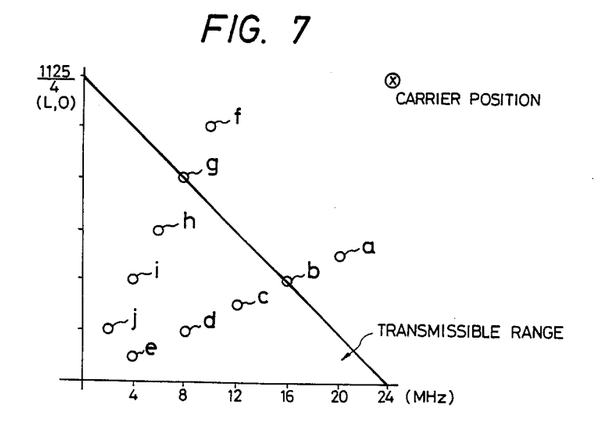
FIG. 7 is a diagram illustrating the frequency range of which an original picture signal belongs when the sampled values shown in FIG. 6 are obtained.

Consequently, when a two-dimensional filter having an arrangement of 11×11 taps is used as a pre-filter, the sampled values obtained after interpolation by the device in FIG. 1 is as shown in FIGS. 4 to 6. As with FIG. 18, FIG. 4 shows sampled values obtained when the picture signal is composed of only the components in the horizontal scanning direction. FIG. 5 shows sampled values obtained when the picture signal is composed of only components in the vertical scanning direction. The diagrams (A) to (J) of FIG. 6 show sampled values obtained where the picture signal is composed of components corresponding to points a to i shown in FIG. 7, respectively. As is apparent from FIGS. 4 to 6, the components in the horizontal scanning direction and in the vertical scanning direction, are reproduced up to 20 MHz, and the components out of the range which can be transmitted are eliminated.

These results may be applied to the line offset sub-sampling as well as the field offset sub-sampling, as described above. Moreover, since a MUSE signal for compressing the band of a high quality TV signal is made by a combination of the field offset sub-sampling and the line offset sub-sampling techniques, the above-mentioned interpolation method for field offset sub-sampling may be wholly applied to inter-field interpolation (interpolation on the basis of a frame which is combination of the first and the thholly applied to inter-field interpolation (interpolation on the basis of a frame which is combination of the first and the third fields and a frame which is a combination of the second and the fourth fields) of the MUSE signal. Moreover, the above-mentioned method may be applied to interpolation by frame offset sub-sampling of the MUSE signal (the composition of the first and the third fields). In this case, it suffices if only a change is performed such that the foregoing interpolation and high band detection in the horizontal and vertical directions are replaced by those in the horizontal and temporal directions. In this case, the 1H-delay circuits 1 and 4 are replaced by 1-frame delay circuits.

Although switching of the outputs of the 1-sampling delay circuit 5 and the adder 10 is performed on the basis of the difference between the respective outputs of the absolute value circuits 8 and 14, the respective outputs of the 1-sampling delay circuit 5 and the adder 10 may be mixed at a mixing ratio according to the difference between the respective outputs of the absolute value circuits 8 and 14 so as to use the mixed value as an interpolation sampled value.

As described above in detail, in the method of sub-sampling interpolation according to the present invention, two interpolation sampled values are calculated on the basis of sampled values at two groups of sampling points which are arranged respectively in the horizontal scanning direction and in the vertical scanning direction or in the horizontal scanning direction and in the time-base direction so that the interpolation is achieved by the one of those two interpolation sampled values which is the lease different from an immediately preceding sampled value in comparison with the other one of the two interpolation sampled values and its immediately preceding sampled value. Accordingly, the unnecessary components which appear in the low band in each of the horizontal scanning direction and the vertical scanning direction can be eliminated by a one-dimensional LPF so that the interpolation can be properly achieved using apparatus of simple construction.

What is claimed is:

1. A method of sub-sampling interpolation in a sub-sampling transmission system comprising the steps of:

successively transmitting sampled values obtained by sub-sampling a picture signal in each of a plurality of successive periods, each having a predetermined length, said plurality of successive periods being N times the period of one picture field (N being a natural number);

receiving said transmitted sampled values; and interpolating non-transmitted sampled values in each of said periods of predetermined length from said sampled values transmitted within at least two periodsampled values in each of said periods of predetermined length from said sampled values transmitted within at least two periods of predetermined length, said two periods including the period of said non-transmitted sampled values, so as to reproduce said picture signal; wherein said interpolation step comprises the steps of:

calculating two one-directional interpolation sampled values for interpolating said non-transmitted sampled values with sampled values which are part of said sampled values transmitted in said two periods of predetermined length and are obtained at two groups of sampling points arranged respectively in the horizontal scanning direction and in the vertical scanning direction with respect to sampling points of said non-transmitted sampled values;

detecting two one-directional high frequency components at said sampling points of said non-transmitted sampled values using said sampled values at said two groups of sampling points, respectively, arranged in the horizontal scanning direction and in the vertical scanning direction;

comparing respective absolute values of said two one-directional high frequency components with each other;

mixing said two interpolation sampled values with each other, with the ratio of the one of said two interpolation sampled values in the direction along which said absolute value is smaller than the other absolute value along the other direction to the other one of said two interpolation sampled values being larger than 1; and interpolating said non-transmitted sampled values from the two mixed interpolation sampled values.

2. A method according to claim 1, in which the step of mixing said two one-directional interpolation sampled values is performed by selecting one of said two one-directional interpolation sampled values.

3. A method according to claim 1, wherein after calculation of said two one-directional interpolation sampled values, said high frequency components are detected on the basis of absolute values of the difference between said two onedirectional interpolation sampled values and sampled values at sampling points adjacent to each other in the same direction with said two one-directional interpolation sampled values, in which the step ts adjacent to each other in the same direction with said two one-directional interpolation sampled values, in which the step of mixing said two one-directional interpolation sampled values is performed by selecting one of said two one-directional interpolation sampled values.

4. A method according to claim 1, including the step of using the sampled values at sampling points arranged in the temporal direction as said sampled values in place of said sampling points arranged in the vertical scanning direction.

5. A method according to claim 4, wherein after calculation of said two one-directional interpolation sampled values, said high frequency components are detected on the basis of absolute values of the difference between said two onedirectional interpolation sampled values and sampled values at sampling points adjacent to each other in the same direction with said two one-directional interpolation sampled values, in which the step of mixing said two one-directional interpolation sampled values is performed by selecting one of said two one-directional interpolation sampled values.

6. A method according to claim 4, in which the step of mixing said two one-directional interpolation sampled values is performed by selecting one of said two one-directional interpolation sampled values.

7. A method according to claim 1 or 4, wherein after calculation of said two one-directional interpolation sampled values, said high frequency components are detected on the basis of absolute values of the differences between said two one-directional interpolation sampled values and sampled values at sampling points adjacent to each other in the same direction with said two one-directional interpolation sampled values.

* * * * *